US010050979B2

(12) United States Patent
Shiota et al.

(10) Patent No.: US 10,050,979 B2
(45) Date of Patent: Aug. 14, 2018

(54) EXECUTING A PROCESS BASED ON VALIDITY INFORMATION INDICATING ONE OF VALIDITY AND INVALIDITY

(71) Applicant: NEC Corporation, Minato-ku, Tokyo (JP)

(72) Inventors: Saburo Shiota, Tokyo (JP); Yuichi Koike, Tokyo (JP)

(73) Assignee: NEC CORPORATION, Tokyo (JP)

(*) Notice: Subject to any disclaimer, the term of this patent is extended or adjusted under 35 U.S.C. 154(b) by 176 days.

(21) Appl. No.: 14/898,821

(22) PCT Filed: Jun. 17, 2014

(86) PCT No.: PCT/JP2014/003231
§ 371 (c)(1),
(2) Date: Dec. 16, 2015

(87) PCT Pub. No.: WO2015/001741
PCT Pub. Date: Jan. 8, 2015

(65) Prior Publication Data
US 2016/0142421 A1    May 19, 2016

(30) Foreign Application Priority Data

Jul. 1, 2013  (JP) .................................. 2013-138056

(51) Int. Cl.
*H04L 29/06* (2006.01)
*G06Q 20/40* (2012.01)
*G06Q 20/34* (2012.01)

(52) U.S. Cl.
CPC ......... *H04L 63/126* (2013.01); *G06Q 20/343* (2013.01); *G06Q 20/346* (2013.01); *G06Q 20/40* (2013.01); *H04L 63/101* (2013.01)

(58) Field of Classification Search
CPC ........................... H04L 63/126; H04L 63/101
(Continued)

(56) References Cited

U.S. PATENT DOCUMENTS 6,931,379 B1 *  8/2005  Sato ................... G06Q 20/3552
                                                380/259
6,978,368 B1 * 12/2005  Miyatake .................. G07F 7/08
                                                713/161
(Continued)

FOREIGN PATENT DOCUMENTS

EP           2136320 A1 * 12/2009 ............. G06F 21/77
JP      H10-187826 A      7/1998
(Continued)

OTHER PUBLICATIONS

International Search Report for PCT Application No. PCT/JP2014/003231, dated Aug. 12, 2014, p. 1.
(Continued)

*Primary Examiner* — Haresh N Patel

(57) ABSTRACT

The validity/invalidity of a credit card, an IC card storing electronic money, or the like is appropriately determined based on a blacklist. A terminal device includes a list storage means and an invalidity recording means. The list storage means stores an identifier, validity information indicating validity or invalidity, and a blacklist that relates the identifier to an invalidity count specification value for a recording medium storing a set value. The invalidity recording means reads from the blacklist, the invalidity count specification value related to the identifier read from the recording medium, and compares the invalidity count specification value with the set value read from the recording medium. The invalidity recording means executes predetermined processing based on the validity information for the recording medium when the set value is equal to the invalidity count specification value.

9 Claims, 12 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2010/0031350 A1* | 2/2010 | Ueda | ....................... | G06F 21/34 |
| | | | | 726/20 |
| 2010/0051690 A1* | 3/2010 | Ling | ....................... | G06Q 20/06 |
| | | | | 235/380 |
| 2010/0205449 A1* | 8/2010 | Eun | ....................... | G06Q 20/341 |
| | | | | 713/185 |
| 2012/0158590 A1* | 6/2012 | Salonen | ................. | G06Q 10/02 |
| | | | | 705/44 |
| 2014/0344898 A1* | 11/2014 | Chen | ....................... | G06Q 40/12 |
| | | | | 726/4 |

FOREIGN PATENT DOCUMENTS

| | | | |
|---|---|---|---|
| JP | H11-143949 A | 5/1999 | |
| JP | 2000-020467 A | 1/2000 | |
| JP | 2011-242926 A | 12/2011 | |
| JP | 4836716 B2 * | 12/2011 | ............... H04L 9/32 |

OTHER PUBLICATIONS

English translation of Written opinion for PCT Application No. PCT/JP2014/003231, p. 1.

* cited by examiner

Fig.2

| INVALID IDID | INVALIDITY COUNT |
|---|---|
|  |  |
|  |  |
|  |  |

BLACKLIST 61

Fig.3

| LOG ID | LOG COUNT VALUE |
|---|---|
|  |  |
|  |  |
|  |  |

EXECUTING A PROCESS BASED ON VALIDITY INFORMATION INDICATING ONE OF VALIDITY AND INVALIDITY

This application is a National Stage Entry of PCT/JP2014/003231 filed on Jun. 17, 2014 which claims priority from Japanese Patent Application 2013-138056 filed on Jul. 1, 2013 the contents of all of which are incorporated herein by reference, in their entirety.

TECHNICAL FIELD

The present invention relates to a validity control system, a terminal device, a server device, a recording medium, a method, and a program and, more particularly, to a system, a terminal device, a server device, a recording medium, a method, and a program for controlling the validity/invalidity of, for example, a credit card using a blacklist.

BACKGROUND ART

PTL 1 discloses a system which executes processing of suspending the use of a credit card fraudulently used in purchasing commodities or services. In the processing of suspending the use, information written in the card is partially destroyed, wrong information is written in the card, and a flag indicating the unavailability (invalidity) of the card is set for the card.

A host computer of this system first outputs information including a blacklist of credit cards of credit company members as card information. The blacklist means a list of invalid cards. A terminal computer of each affiliated store receives and stores the information and executes processing of suspending the use of a credit card input to a card reader when the card is on the blacklist.

In this system, the host computer regularly or irregularly transmits the information of all card members. When any affiliated store has basic card information, only information obtained when the credit card has changed from "valid" to "invalid" or from "invalid" to "valid" is transmitted to update the basic information in the affiliated store.

CITATION LIST

Patent Literature

[PTL 1] Japanese Unexamined Patent Application Publication No. H11-143949

SUMMARY OF INVENTION

Technical Problem

In the use of credit cards, a credit card A may become temporarily invalid and then become valid. This may happen when, for example, the settlement account for the credit card temporarily contains insufficient funds, resulting in a delay of payment. In such a case, the terminal computer of any affiliated store of the system as described in PTL 1 may determine, after the card A becomes valid again, that the card A is invalid, on the basis of the old blacklist. This computer may then, for example, reject predetermined payment processing and execute processing of suspending the use of the card A.

In the aforementioned case, the host computer distributes a blacklist that includes the card A to the terminal computer of each affiliated store when the card A becomes invalid. Thereafter, when the card A becomes valid again, the host computer distributes a new blacklist that does not include the card A to the terminal computer of each affiliated store.

In this case, even after the distribution of the new blacklist, some terminal computers may temporarily continue to use the old blacklist. This may happen when, for example, a certain terminal computer is in continuous operation, although the terminal computers require rebooting to use the distributed blacklist for processing of suspending the use of the card.

In this situation, when the user tries to use the card A in the affiliated store while the terminal computer is still on the continuous operation, the terminal computer determines based on the old blacklist that the card A is invalid. The terminal computer then, for example, rejects predetermined payment processing and executes processing of suspending the use of the card A.

Similar circumstances may occur for, for example, an IC (Integrated Circuit) card storing electronic money. It is an object of the present invention to provide a technique for solving the above-mentioned problem.

Solution to Problem

A terminal device relating an exemplary embodiment of the present invention includes:

list storage means for storing an identifier, validity information indicating one of validity and invalidity, and a blacklist that relates the identifier to an invalidity count specification value for a recording medium storing a set value; and invalidity recording means for reading from the blacklist, the invalidity count specification value related to the identifier read from the recording medium, comparing the invalidity count specification value with the set value read from the recording medium, and executing predetermined processing based on the validity information for the recording medium when the set value is equal to the invalidity count specification value.

A recording medium relating an exemplary embodiment of the present invention includes:

ID storage means for storing an identifier read from a terminal device, the terminal device reading from a stored blacklist, an invalidity count specification value related to the identifier read from the recording medium, comparing the invalidity count specification value with a set value read from the recording medium, and executing predetermined processing based on validity information indicating one of validity and invalidity of the recording medium when the set value is equal to the invalidity count specification value;

validity information storage means for storing the validity information; and set value storage means for storing the set value.

A server device, relating an exemplary embodiment of the present invention is connected to a terminal device, the terminal device reading from a stored blacklist, an invalidity count specification value related to an identifier read from a recording medium, comparing the invalidity count specification value with a set value read from the recording medium, and executing predetermined processing based on validity information indicating one of validity and invalidity of the recording medium when occurring that the set value is equal to the invalidity count specification value.

The server device includes:

invalidity count storage means for storing the invalidity count specification value related to the identifier for the recording medium as invalidated;

list master storage means for storing an original of the blacklist;

addition means for receiving as input, the identifier for the recording medium as invalidated, setting forward the invalidity count specification value stored in the invalidity count storage means and related to the input identifier, and adding the forward-set value to the original of the blacklist as the invalidity count specification value related to the input identifier;

deletion means for receiving as input, the identifier for the recording medium as returned to valid state, and deleting from the original of the blacklist, the invalidity count specification value related to the input identifier; and list distribution means for distributing the original of the blacklist to the terminal device.

A method relating an exemplary embodiment of the present invention includes:

storing an identifier, validity information indicating one of validity and invalidity, and a blacklist that relates the identifier to an invalidity count specification value for a recording medium storing a set value; and reading from the blacklist, the invalidity count specification value related to the identifier read from the recording medium, comparing the invalidity count specification value with the set value read from the recording medium, and executing predetermined processing based on the validity information for the recording medium when the set value is equal to the invalidity count specification value.

A method relating an exemplary embodiment of the present invention includes:

establishing connection to a terminal device, the terminal device reading from a stored blacklist, an invalidity count specification value related to an identifier read from a recording medium, comparing the invalidity count specification value with a set value read from the recording medium, and executing predetermined processing based on validity information indicating one of validity and invalidity of the recording medium when occurring the set value is equal to the invalidity count specification value;

storing in invalidity count storage means, the invalidity count specification value related to the identifier for the recording medium as invalidated;

storing an original of the blacklist;

receiving as input, the identifier for the recording medium as invalidated, setting forward the invalidity count specification value stored in the invalidity count storage means and related to the input identifier, and adding the forward-set value to the original of the blacklist as the invalidity count specification value related to the input identifier;

receiving as input, the identifier for the recording medium as returned to valid state, and deleting from the original of the blacklist, the invalidity count specification value related to the input identifier; and distributing the original of the blacklist to the terminal device.

A program relating an exemplary embodiment of the present invention, causes a computer to execute:

list storage processing of storing an identifier, validity information indicating one of validity and invalidity, and a blacklist that relates the identifier to an invalidity count specification value for a recording medium storing a set value; and invalidity recording processing of reading from the blacklist, the invalidity count specification value related to the identifier read from the recording medium, comparing the invalidity count specification value with the set value read from the recording medium, and executing predetermined processing based on the validity information for the recording medium when the set value is equal to the invalidity count specification value.

A program relating an exemplary embodiment of the present invention is used in a computer connected to a terminal device, the terminal device reading from a stored blacklist, an invalidity count specification value related to an identifier read from a recording medium, comparing the invalidity count specification value with a set value read from the recording medium, and executing predetermined processing based on validity information indicating one of validity and invalidity of the recording medium when occurring the set value is equal to the invalidity count specification value.

The program causes the computer to execute:

processing of storing in invalidity count storage means, the invalidity count specification value related to the identifier for the recording medium as invalidated;

list master storage processing of storing an original of the blacklist;

addition processing of receiving as input, the identifier for the recording medium as invalidated, setting forward the invalidity count specification value stored in the invalidity count storage means and related to the input identifier, and adding the forward-set value to the original of the blacklist as the invalidity count specification value related to the input identifier;

deletion processing of receiving as input, the identifier for the recording medium as returned to valid state, and deleting from the original of the blacklist, the invalidity count specification value related to the input identifier; and list distribution processing of distributing the original of the blacklist to the terminal device.

Advantageous Effects of Invention

The system according to the present invention can appropriately determine, based on a blacklist, the validity/invalidity of a credit card, an IC card storing electronic money, or the like. This system can appropriately determine the validity/invalidity of even, for example, a credit card which is temporarily invalidated and then validated again.

BRIEF DESCRIPTION OF DRAWINGS

FIG. 2 illustrates the configuration of a blacklist 61 stored in a list storage unit 12 of a terminal device 1 and a list master storage unit 22 of a server device 2.

FIG. 3 illustrates accumulated data of a log stored in a log storage unit 21 of the server device 2.

DESCRIPTION OF EMBODIMENTS

First Exemplary Embodiment

Figure 1:
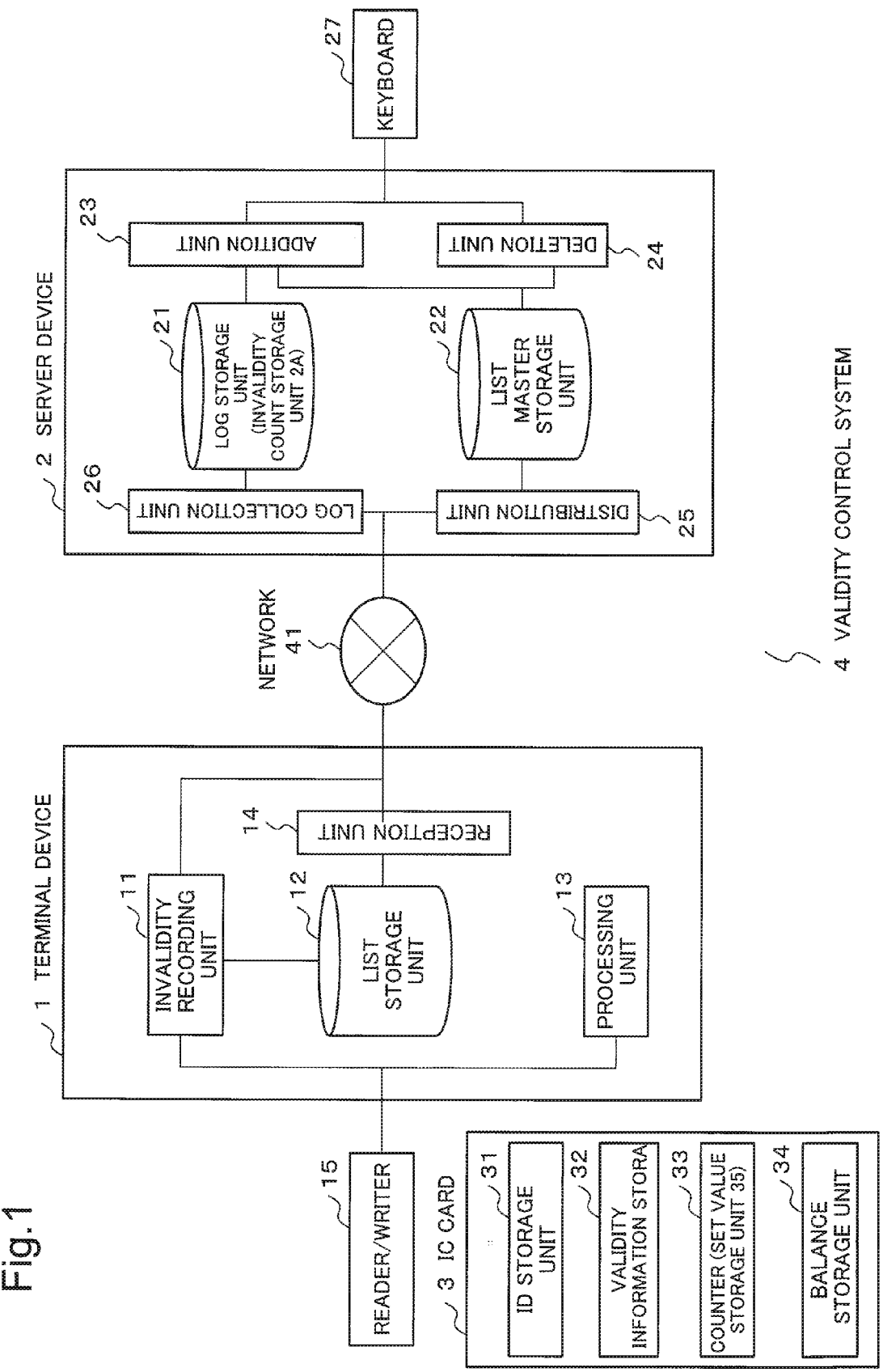
FIG. 1 is a block diagram illustrating the configuration of a validity control system 4 according to a first exemplary embodiment.

FIG. 1 is a block diagram illustrating the configuration of a validity control system 4 according to this exemplary embodiment. The validity control system 4 includes a terminal device 1 and a server device 2 connected to each other via a network 41. A plurality of terminal devices 1 are normally provided. The terminal device 1 is located at, for example, the payment counter of a shop. The server device 2 is located at, for example, a bank or a credit card company.

The terminal device 1 includes an invalidity recording unit 11, a list storage unit 12, a processing unit 13, and a reception unit 14. A reader/writer 15 is connected to the invalidity recording unit 11 and the processing unit 13.

The reader/writer 15 reads/writes data stored in an IC card 3. The IC card 3 is implemented using, for example, a portable recording medium storing electronic money. Alternatively, the IC card 3 may be implemented in a credit card. The owner of the IC card 3 pays the purchase money for commodities or services with the IC card 3 in shops.

The IC card 3 includes an ID storage unit 31, a validity information storage unit 32, and a counter 33. The ID storage unit 31 stores a card ID or a user ID (IDentification; to be simply referred to as an ID hereinafter). The validity information storage unit 32 stores validity information indicating the validity or invalidity of the IC card 3. The counter 33 stores the count of the number of times the IC card 3 has been invalidated. The initial value of the validity information storage unit 32 is "validity," and the initial value of the counter 33 is 0. The IC card 3 may further include a balance storage unit 34 which stores the balance of electronic money or the credit balance of a credit card to be stored.

The owner of the IC card 3 can make payment with the IC card 3 only when the validity information stored in the validity information storage unit 32 indicates validity. This owner can pay, for example, an amount of money stored in the balance storage unit 34.

The IC card 3 becomes invalid when, for example, the legitimate owner loses the IC card 3 and then applies to a bank or a credit card company for the suspension of the use of the IC card 3. The IC card 3 returns to valid state when the legitimate owner applies for the cancellation of the suspension of the use because, for example, he or she has discovered the IC card 3 in his or her home. Assume that the IC card 3 is used as a credit card. Then, for example, the IC card 3 becomes invalid when a bill cannot be debited from the bank account, and then returns to valid state when a certain amount of money is deposited to the bank account to enable payment by direct debit.

The list storage unit 12 of the terminal device 1 stores a blacklist 61 indicating the ID of the invalidated IC card 3 or the like. The invalidity recording unit 11 records invalidity in the validity information storage unit 32 of any IC card 3 when an ID read from the IC card 3 has been registered in the blacklist 61 stored in the list storage unit 12. In this case, the invalidity recording unit 11 generates a log and transmits it to the server device 2. The processing unit 13 executes predetermined processing such as payment processing when the validity information read from the IC card 3 indicates validity.

The reception unit 14, for example, receives the blacklist 61 from the server device 2 and stores it in the list storage unit 12. The server device 2 creates and updates an original of the blacklist 61 and distributes it to the terminal device 1 via the network 41. Upon receiving the original, the reception unit 14 of the terminal device 1 stores it in the list storage unit 12 to store a copy of the blacklist 61. The blacklist 61 may be distributed not by communication but by mailing a commutative medium or the like.

The invalidity recording unit 11, the processing unit 13, and the reception unit 14 are implemented using a logic circuit or the like. These units may also be stored in a memory (not illustrated) of the terminal device 1 and implemented by software executed by a processor (not illustrated) of the terminal device 1. The list storage unit 12 serves as a storage device such as an IC memory or a disk device.

The server device 2 includes a log storage unit 21, a list master storage unit 22, an addition unit 23, a deletion unit 24, a distribution unit 25, and a log collection unit 26. A keyboard 27 is connected to the addition unit 23 and the deletion unit 24.

When the addition unit 23 obtains the ID of an IC card 3 to be invalidated from the keyboard 27, it adds this ID or the like to the original of the blacklist 61. When the deletion unit 24 obtains the ID of an IC card 3 to be validated from the keyboard 27, it deletes this ID or the like from the original of the blacklist 61.

The list master storage unit 22 stores the original of the blacklist 61. The distribution unit 25 distributes a copy of the blacklist 61 stored in the list master storage unit 22 to the terminal device 1.

The log collection unit 26 receives the above-mentioned log from the invalidity recording unit 11 of the terminal device 1 and stores, for example, time-series data of this log in the log storage unit 21. The log storage unit 21 is referred to by the addition unit 23.

The addition unit 23, the deletion unit 24, the distribution unit 25, and the log collection unit 26 are implemented using a logic circuit or the like. These units may also be stored in a memory (not illustrated) of the server device 2 and implemented by software executed by a processor (not illustrated) of the server device 2. Each of the log storage unit 21 and the list master storage unit 22 serves as a storage device such as an IC memory or a disk device.

FIG. 2 illustrates the configuration of the blacklist 61 stored in the list storage unit 12 of the terminal device 1 and the list master storage unit 22 of the server device 2. The blacklist 61 serves as a list of a pair of an invalid ID 62 that is the ID of an invalidated IC card 3 and an invalidity count 63 that is the count of the number of times the IC card 3 has been invalidated.

FIG. 3 illustrates accumulated data of a log stored in the log storage unit 21 of the server device 2. The invalidity recording unit 11 of the terminal device 1 transmits to the server device 2, a log including the ID read from the IC card 3 and the updated value (the value written in the IC card 3) of the count value. The log collection unit 26 stores the ID of the received log in a log ID 51 of the log storage unit 21 and the updated value of the count value in a log count value 52.

Figure 4:
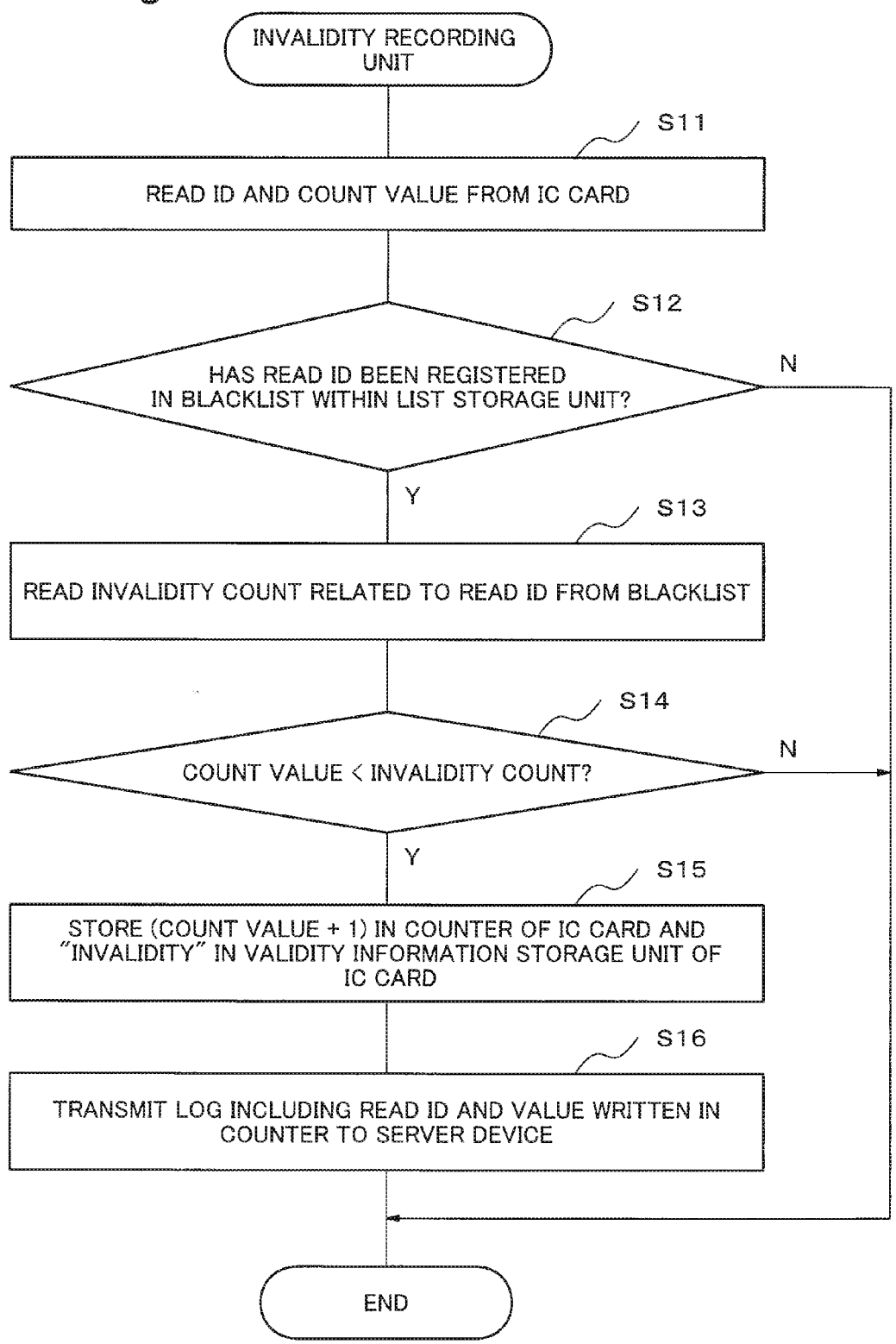
FIG. 4 is an operational flowchart of an invalidity recording unit 11 of the terminal device 1.

FIG. 4 is an operational flowchart of the invalidity recording unit 11 of the terminal device 1. The invalidity recording unit 11 is activated when, for example, the IC card 3 is held over the reader/writer 15.

The invalidity recording unit 11 reads an ID and a count value from the IC card 3 (step S11). The ID is read from the ID storage unit 31 and the count value is read from the counter 33.

The invalidity recording unit 11 checks whether the read ID has been registered in the blacklist 61 stored in the list storage unit 12 (step S12). At this time, the invalidity recording unit 11 checks whether an invalid ID 62 matching the read ID has been registered in the blacklist 61. If an invalid ID 62 matching the read ID has been registered (YES in step S12), the invalidity recording unit 11 reads an invalidity count 63 related to the invalid ID 62 from the blacklist 61 (step S13).

If the count value read from the IC card 3 is smaller than the value of the invalidity count 63 (YES in step S14), the invalidity recording unit 11 calculates (Count Value+1), that is, counts up and stores the calculated value A in the counter 33 of the IC card 3 (step S15). In other words, the invalidity recording unit 11 updates the count value of the IC card 3 to the calculated value A. The invalidity recording unit 11 may update the count value of the IC card 3 to the invalidity count 63, instead of count-up operation. The invalidity recording unit 11 stores validity information indicating "invalidity" in the validity information storage unit 32 (step S15).

Lastly, the invalidity recording unit 11 generates a log including the calculated value A and the ID read from the IC card 3 and transmits it to the server device 2 (step S16).

If the read ID has not been registered in the blacklist 61 stored in the list storage unit 12 (NO in step S12), or the count value read from the IC card 3 is not smaller than the value of the invalidity count 63 (NO in step S14), the invalidity recording unit 11 executes no specific operation.

Figure 5:
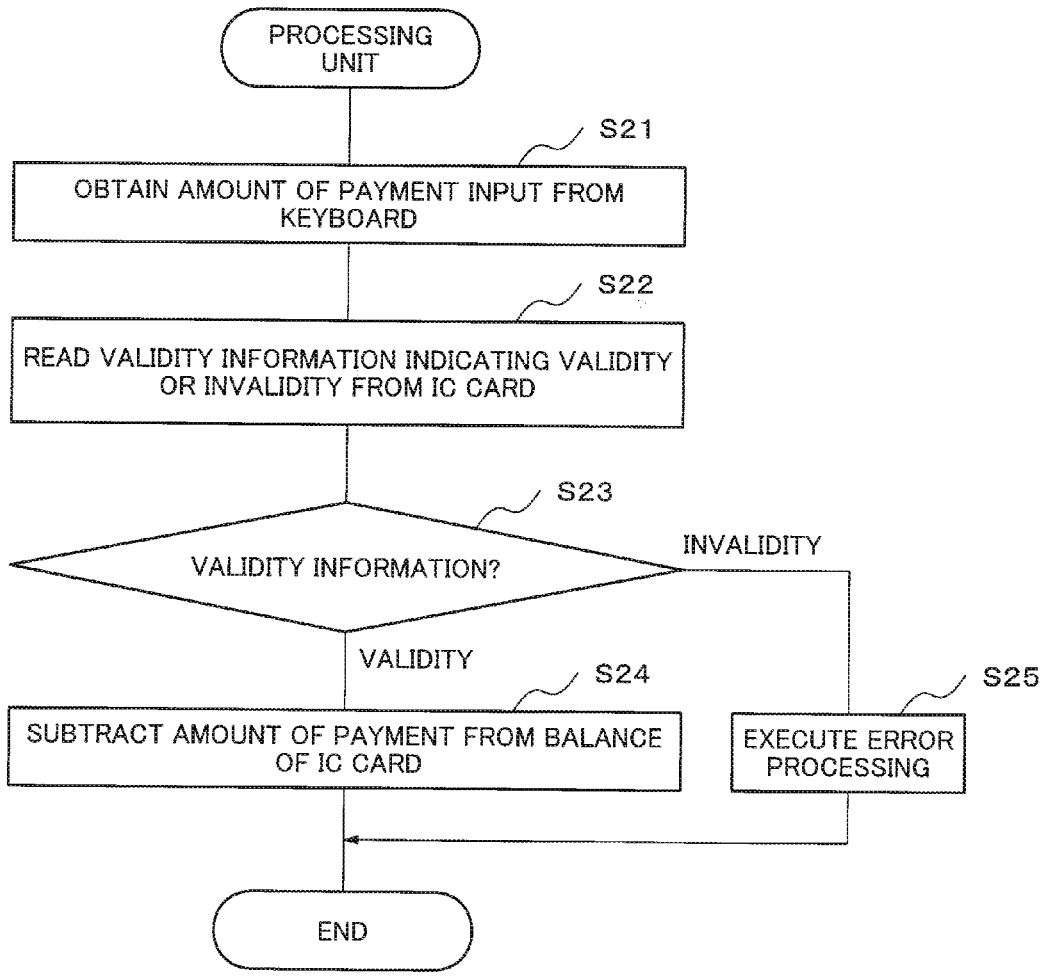
FIG. 5 is an operational flowchart of a processing unit 13 of the terminal device 1.

FIG. 5 is an operational flowchart of the processing unit 13. The processing unit 13 is activated when, for example, the invalidity recording unit 11 ends its operation. The processing unit 13 executes processing of accomplishing the original purpose using the IC card 3, such as payment processing which uses electronic money for the IC card 3.

The processing unit 13 obtains an amount of payment input from a keyboard (not illustrated) first (step S21), and then reads validity information indicating validity or invalidity from the IC card 3 (step S22). The validity information is read from the validity information storage unit 32.

If the validity information indicates "validity" (VALIDITY in step S23), the processing unit 13 subtracts the amount of payment from the balance of electronic money recorded in the balance storage unit 34 of the IC card 3 (step S24). If the validity information indicates "invalidity" (INVALIDITY in step S23), the processing unit 13 executes error processing (step S25). The processing unit 13, for example, outputs a warning message to a display device (not illustrated) of the terminal device 1.

Figure 6:
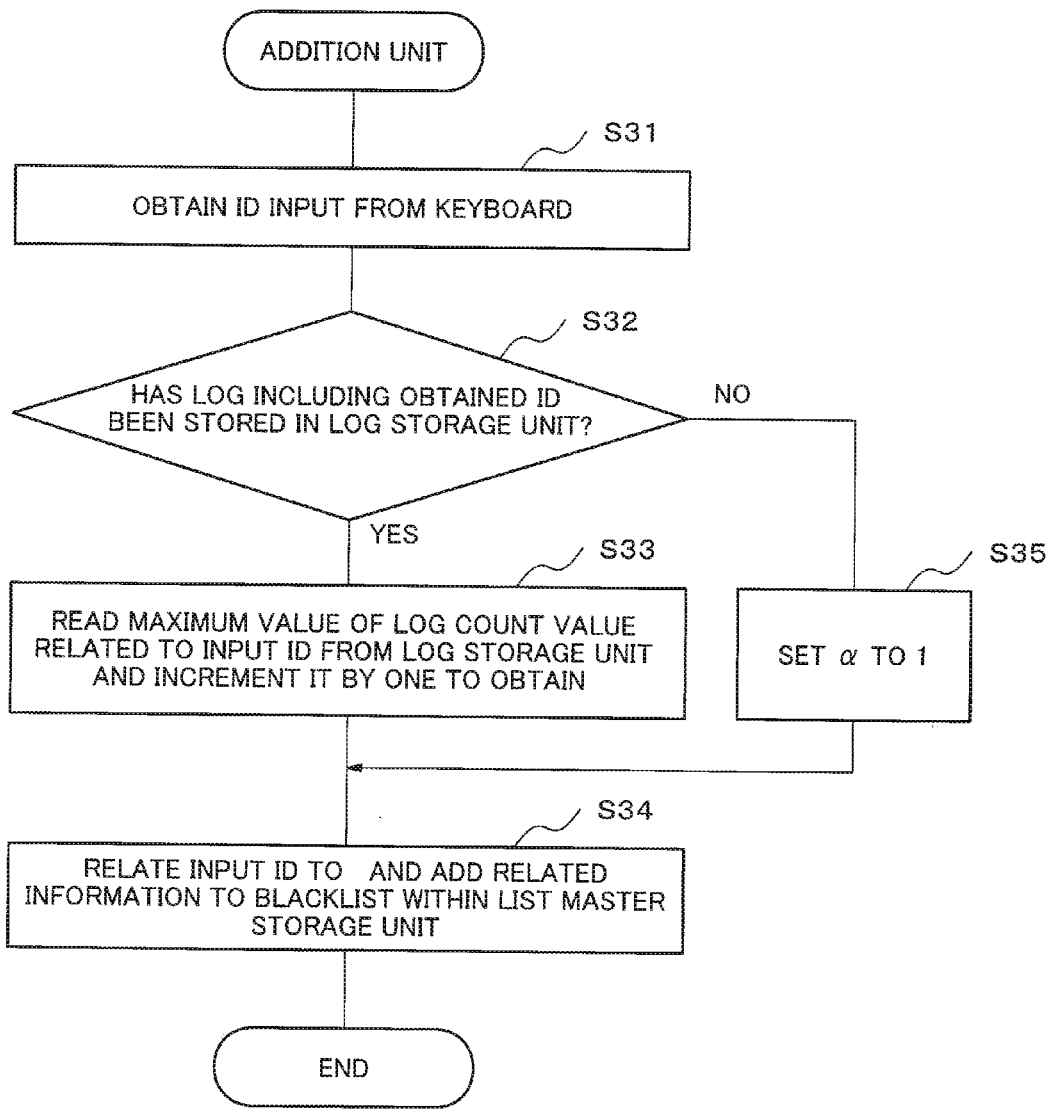
FIG. 6 is an operational flowchart of an addition unit 23 of the server device 2.

FIG. 6 is an operational flowchart of the addition unit 23 of the server device 2. The addition unit 23 is started when an instruction to invalidate the IC card 3 is input from the keyboard 27 or the like.

The addition unit 23 first obtains the ID of an invalidated IC card 3 from the keyboard 27 (step S31). The addition unit 23 then checks whether a log of a log ID 51 matching the obtained ID has been stored in the log storage unit 21 (step S32). When a certain IC card 3 repeats a plurality of changes between invalidity and validity, a plurality of logs as mentioned earlier exist. If such a log has been stored (YES in step S32), the addition unit 23 reads a maximum log count value 52 of at least one such log from the log storage unit 21 and increments it by one to obtain a value α (step S33). The maximum log count value 52 is obtained from the latest one of logs each having a log ID 51 matching the input ID.

If no such log has been stored (NO in step S32), the addition unit 23 sets the value α to 1 (step S35).

Lastly, the addition unit 23 relates the input ID to the value α and adds the related information to the blacklist 61 within the list master storage unit 22 (step S34). More specifically, the addition unit 23 sets the input ID as the invalid ID 62 and registers the value α in the blacklist 61 as the invalidity count 63.

Figure 7:
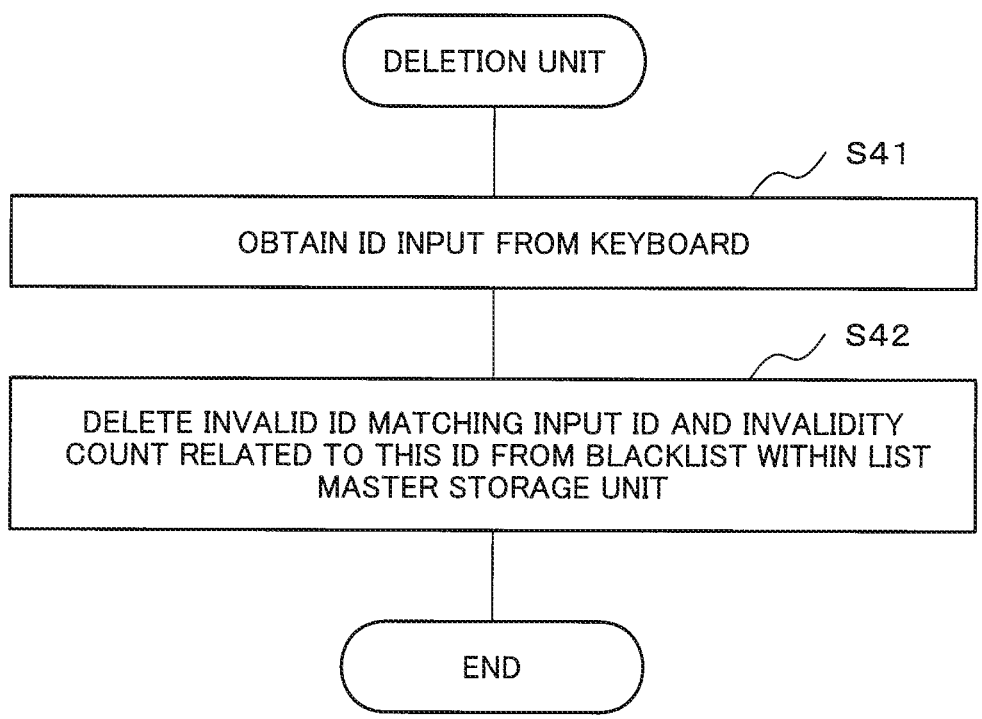
FIG. 7 is an operational flowchart of a deletion unit 24 of the server device 2.

FIG. 7 is an operational flowchart of the deletion unit 24. The deletion unit 24 is started when an instruction to validate the IC card 3 is input from the keyboard 27 or the like.

The deletion unit 24 first obtains the ID of a validated IC card 3 from the keyboard 27 (step S41). The deletion unit 24 then deletes an invalid ID 62 matching the obtained ID and a related invalidity count 63 from the blacklist 61 within the list master storage unit 22 (step S42).

The distribution unit 25 distributes to the terminal device 1, the blacklist 61 within the list master storage unit 22 maintained and managed by the addition unit 23 and the deletion unit 24 in the foregoing way. The blacklist 61 may be distributed periodically or every time addition or deletion has been done a predetermined number of times.

The validity control system 4 according to this exemplary embodiment can appropriately determine based on the blacklist 61 the validity/invalidity of a credit card, an IC card 3 storing electronic money, or the like. This system can appropriately determine the validity/invalidity of even, for example, an IC card 3 which is temporarily invalidated and then validated again. This is because the invalidity count is stored in both the IC card 3 and the blacklist 61 stored in the terminal device 1.

When, for example, a certain IC card 3 is invalidated for the first time, the count value of the counter 33 is 0. The invalidity count 63 of the first blacklist 61 is 1. When this IC card 3 is input to the terminal device 1 that stores the first blacklist 61, the terminal device 1 records validity information indicating invalidity in this card and sets the count value of the counter 33 to 1. Thus, this IC card 3 is thereafter not determined to be invalid based on the blacklist 61 by the terminal device 1 that stores the first blacklist 61. In other words, when this IC card 3 is invalidated and then returns to valid state, it is not erroneously determined to be invalid based on the old blacklist 61. The user can hold this IC card 3 over the reader/writer 15 of the terminal device 1 to enable the processing unit 13 to execute predetermined processing based on validity information indicating validity. Examples of the predetermined processing may include herein, payment processing which uses electronic money or the credit balance of a credit card stored in the balance storage unit 34.

The IC card 3 may be changed into an IC memory in another form or into other recording media such as a USB (Universal Serial Bus) memory. In this case, the reader/writer 15 is changed into a USB interface. Further, the IC card 3 may be replaced with a recording medium which is attached to a wheelchair or the exterior of an automobile and used in, for example, drive-through payment, in place of an object carried about by a human.

The value stored in each of the counter 33 of the IC card 3 and the invalidity count 63 included in the blacklist need not always be the value of the "count" itself that starts from zero initial value and is incremented by one, as in this exemplary embodiment. This value need only be, for example, information which can be used to specify the invalidity count in accordance with a rule or a conversion table in the validity control system 4, that is, an invalidity count specification value. Examples may include a numerical value which takes an initial value of 5 and is incremented by two with an increase in count of the number of times the IC card 3 has been invalidated.

The invalidity count specification value may also be a value which takes an initial value as sufficiently large as, for example, 1000 and is decremented by one with an increase in count. The invalidity count specification value may further be non-numerical information such as alphabets or kana characters, as long as the sequence can be specified.

In such a case, the comparison in step S14 or the count-up in step S15 of FIG. 4 by the invalidity recording unit 11 are construed as processing when the invalidity count specification value is mapped to the count. An arithmetic operation actually applied to the invalidity count specification value is slightly changed in accordance with the invalidity count specification value. When, for example, the invalidity count specification value is a numerical value decremented by two with an increase in count, the relationship of values in the determination of step S14 is reversed. In the processing of incrementing the invalidity count by one in step S15, the invalidity count specification value is decremented by two. An arithmetic operation for the invalidity count specification value (in the above-mentioned example, decrementing the invalidity count specification value by two) equivalent to the processing of incrementing the count by one will sometimes be referred to as "setting the invalidity count specification value forward" hereinafter.

Instead of providing the terminal device 1 with a processing unit 13, another device may include a processing unit 13. The invalidity recording unit 11 and the processing unit 13 may be integrally implemented so that, for example, the invalidity recording unit 11 is equipped with the function of the processing unit 13.

The log storage unit 21 is also referred to as an invalidity count storage unit 2A and the counter 33 is also referred to as a set value storage unit 35.

The variations to this exemplary embodiment are also applicable to the following exemplary embodiments.

Second Exemplary Embodiment

Figure 8:
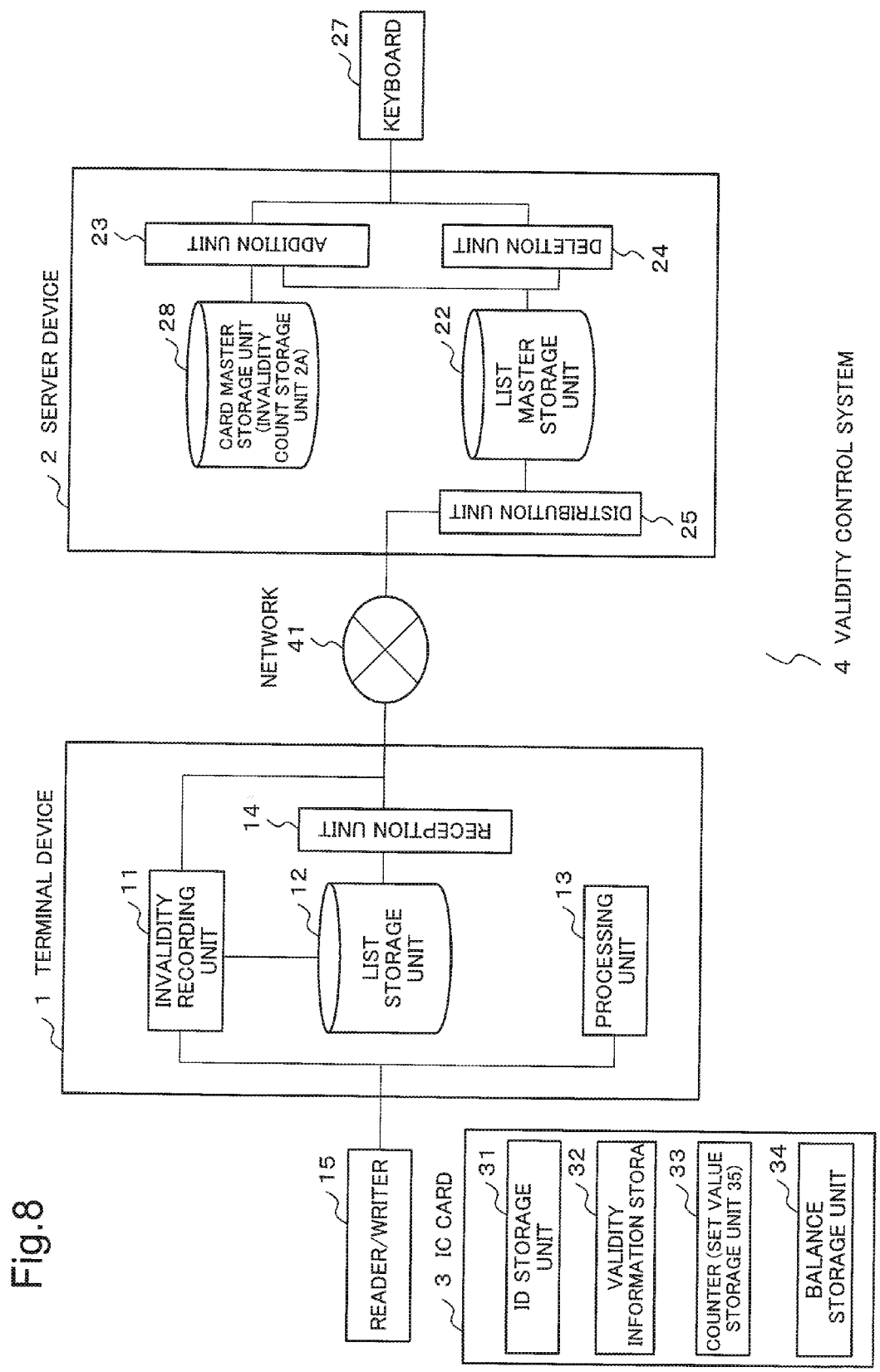
FIG. 8 is a block diagram illustrating the configuration of a validity control system 4 according to a second exemplary embodiment.

FIG. 8 is a block diagram illustrating the configuration of a validity control system 4 according to a second exemplary embodiment. The validity control system 4 according to this exemplary embodiment includes a card master storage unit 28, instead of including the log collection unit 26 and the log storage unit 21 provided to the validity control system 4 according to the first exemplary embodiment.

The card master storage unit 28 serves as a storage device such as an IC memory or a disk device.

Figure 9:
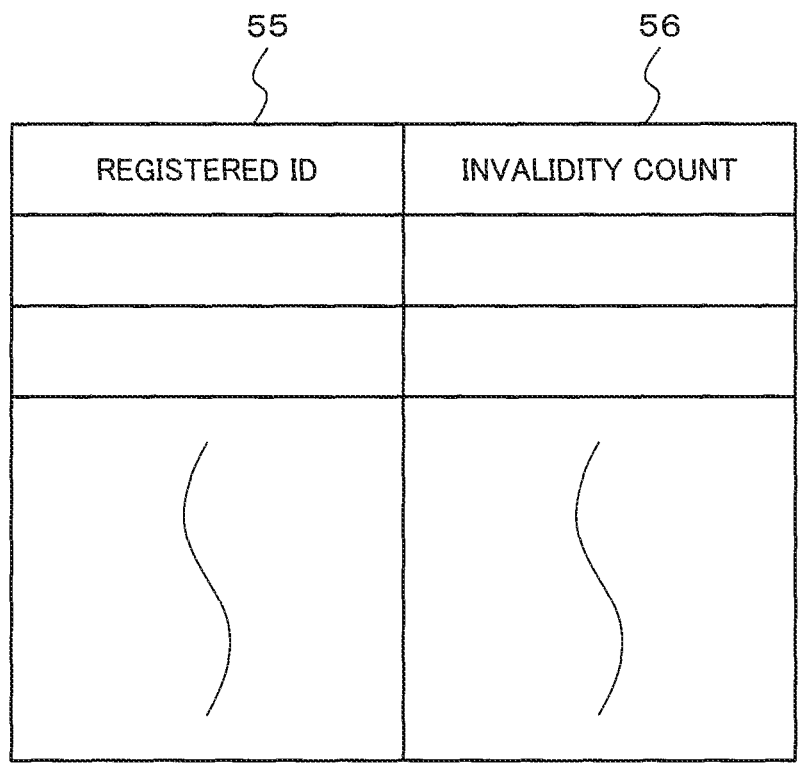
FIG. 9 illustrates the configuration of data stored in a card master storage unit 28 of a server device 2.

FIG. 9 illustrates the configuration of data stored in the card master storage unit 28 of a server device 2. The card master storage unit 28 stores a registered ID 55 that is, for example, the ID of every issued IC card 3 to be invalidated, and an invalidity count 56 that is the count of the number of times the IC card 3 has been invalidated. Every time, for example, a bank or a credit card company issues an IC card 3 to the user, the registered ID 55 and zero initial value of the invalidity count 56 are registered in the card master storage unit 28.

Figure 10:
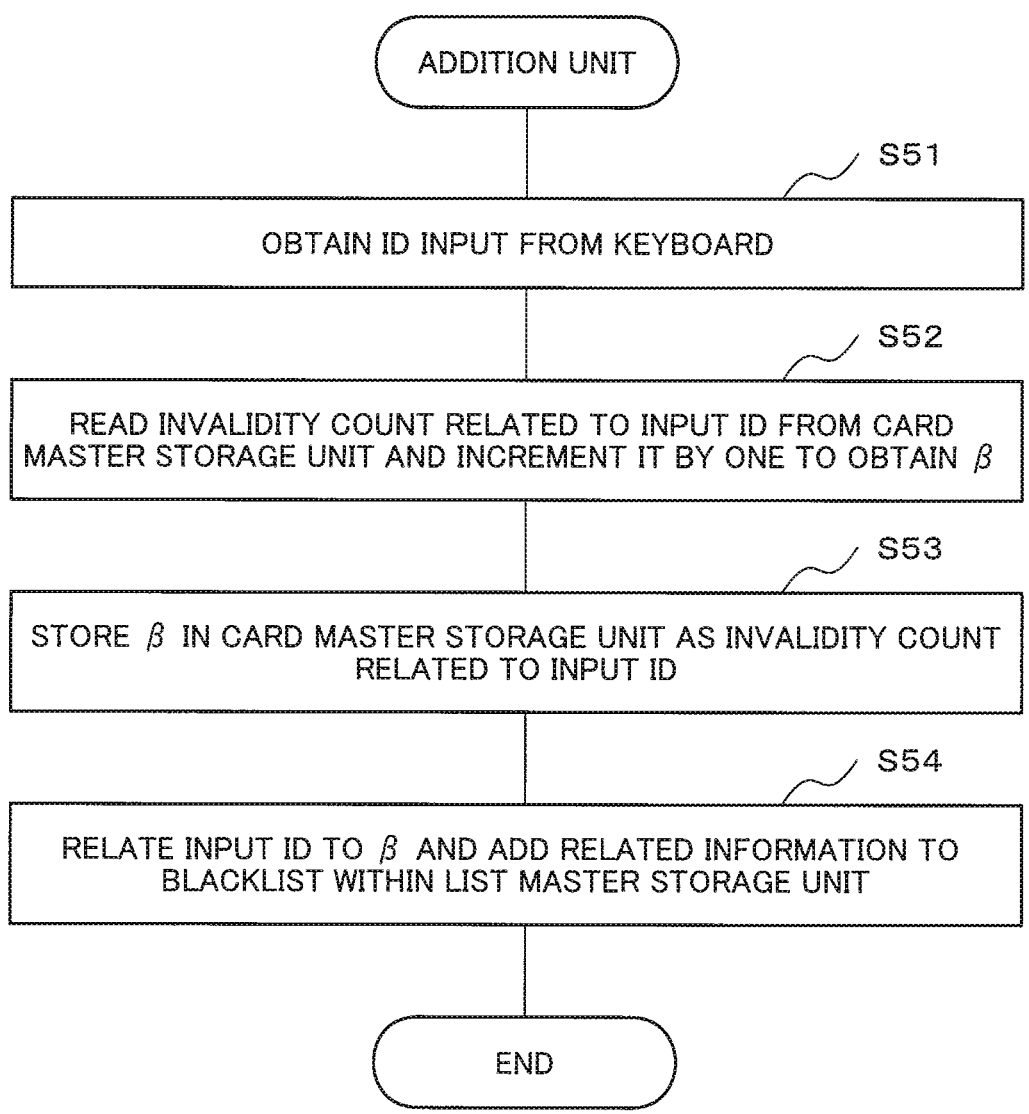
FIG. 10 is an operational flowchart of an addition unit 23 of the server device 2 according to the second exemplary embodiment.

FIG. 10 is an operational flowchart of an addition unit 23 according to this exemplary embodiment. The addition unit 23 is started when an instruction to invalidate the IC card 3 is input from a keyboard 27 or the like.

The addition unit 23 first obtains the ID of an invalidated IC card 3 from the keyboard 27 (step S51). The addition unit 23 then reads an invalidity count 56 related to a registered ID 55 matching the obtained ID from the card master storage unit 28 and increments it by one to obtain a value β (step S52).

The addition unit 23 stores the value β in the card master storage unit 28 as an invalidity count 56 related to a registered ID 55 matching the ID obtained from the keyboard 27 (step S53).

Lastly, the addition unit 23 relates the ID obtained from the keyboard 27 to the value β and adds the related information to a blacklist 61 within a list master storage unit 22 (step S54). More specifically, the addition unit 23 sets the ID obtained from the keyboard 27 as an invalid ID 62 and registers the value β in the blacklist 61 as an invalidity count 63.

An invalidity recording unit 11 according to this exemplary embodiment does not perform log transmission (step S16 in FIG. 4). Except for the above-described features, the validity control system 4 according to this exemplary embodiment is the same as the validity control system 4 according to the first exemplary embodiment.

The validity control system 4 according to this exemplary embodiment provides the same effect as the validity control system 4 according to the first exemplary embodiment while keeping the load of a network 41 low. This can be achieved because the terminal device 1 transmits no log to the server device 2.

The card master storage unit 28 is also referred to as an invalidity count storage unit 2A.

Third Exemplary Embodiment

Figure 11:
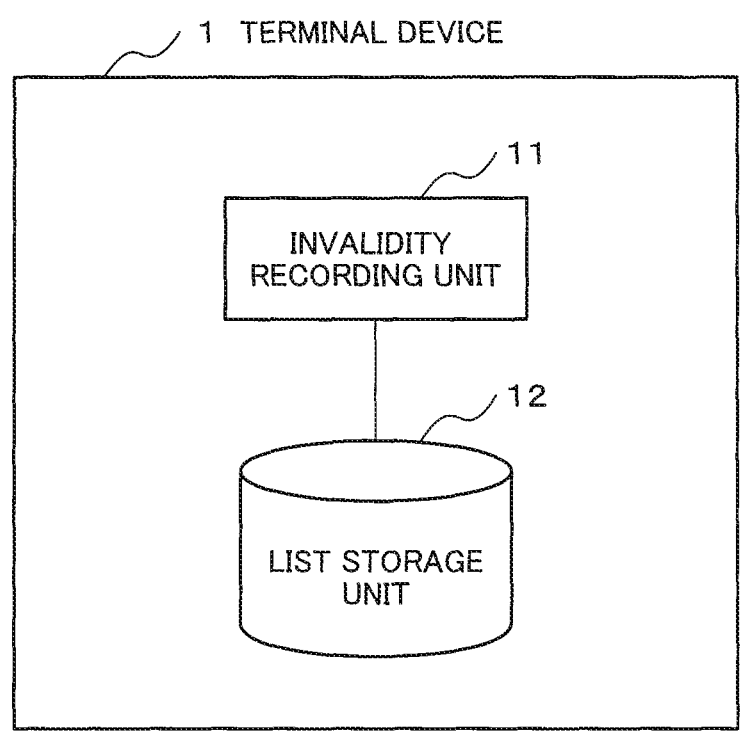
FIG. 11 is a block diagram illustrating the configuration of a terminal device 1 according to a third exemplary embodiment.

FIG. 11 is a block diagram illustrating the configuration of a terminal device 1 according to a third exemplary embodiment. The terminal device 1 includes an invalidity recording unit 11 and a list storage unit 12.

The list storage unit 12 stores an ID, validity information indicating validity or invalidity, and a blacklist 61 which relates an invalidity count 63 of an IC card 3 storing a count value to an invalid ID 62 that is an invalidated ID.

The invalidity recording unit 11 reads from the blacklist 61, an invalidity count 63 related to the ID read from the IC card 3 and compares the invalidity count 63 with the count value read from the IC card 3. If the count value is equal to the invalidity count, the invalidity recording unit 11 executes predetermined processing based on the validity information of the IC card 3. Examples of the predetermined processing may include payment processing.

The terminal device 1 according to this exemplary embodiment can appropriately determine based on the blacklist 61 the validity/invalidity of a credit card, an IC card 3 storing electronic money, or the like. This device can appropriately determine the validity/invalidity of even, for example, an IC card 3 which is temporarily invalidated and then validated again. The reason is the same as given in the first exemplary embodiment.

Fourth Exemplary Embodiment

Figure 12:
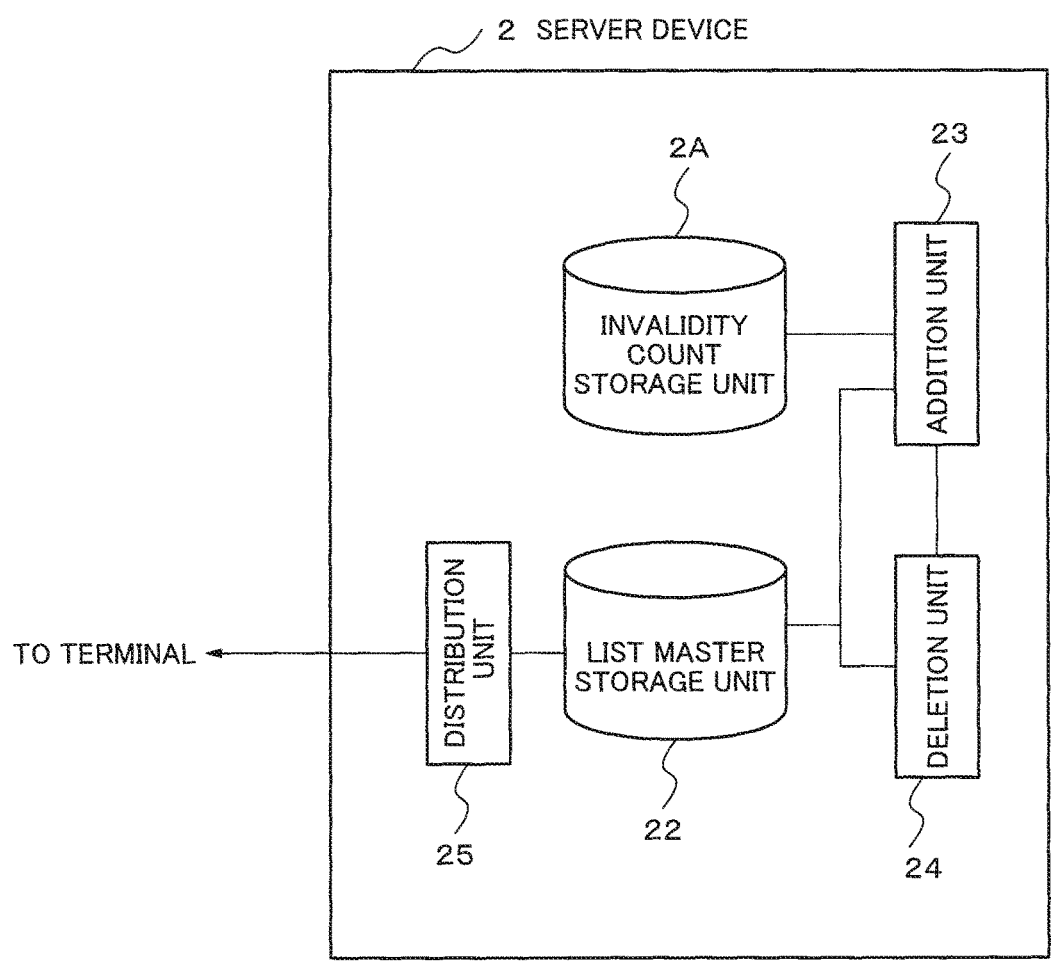
FIG. 12 is a block diagram illustrating the configuration of a server device 2 according to a fourth exemplary embodiment.

FIG. 12 is a block diagram illustrating the configuration of a server device 2 according to a fourth exemplary embodiment.

The server device 2 is connected to a terminal device. The terminal device reads from a stored blacklist, an invalidity count related to an ID read from an IC card and compares the invalidity count with a set value read from the IC card. If the set value is equal to an invalidity count specification value, the terminal device executes predetermined processing, such as payment processing, based on validity information indicating the validity or invalidity of the IC card.

The server device 2 includes an invalidity count storage unit 2A, a list master storage unit 22, an addition unit 23, a deletion unit 24, and a distribution unit 25.

The invalidity count storage unit 2A stores an invalidity count related to the ID of an invalidated IC card 3. The list master storage unit 22 stores the original of a blacklist 61.

The addition unit 23 receives the ID of an invalidated IC card 3 as input and increments the invalidity count stored in the invalidity count storage unit 2A related to the input ID. The addition unit 23 adds the incremented value to the original of the blacklist 61 as an invalidity count 63 related to the input ID.

The deletion unit 24 receives the ID of an IC card 3 returned to valid state as input and deletes an invalidity count 63 related to the input ID from the original of the blacklist 61. The distribution unit 25 distributes the original of the blacklist 61 to the terminal device.

The terminal device connected to the server device 2 according to this exemplary embodiment can appropriately determine based on the blacklist 61 the validity/invalidity of a credit card, an IC card 3 storing electronic money, or the like. This terminal device can appropriately determine the validity/invalidity of even, for example, an IC card 3 which is temporarily invalidated and then validated again. The reason is the same as given in the first exemplary embodiment.

Fifth Exemplary Embodiment

Figure 13:
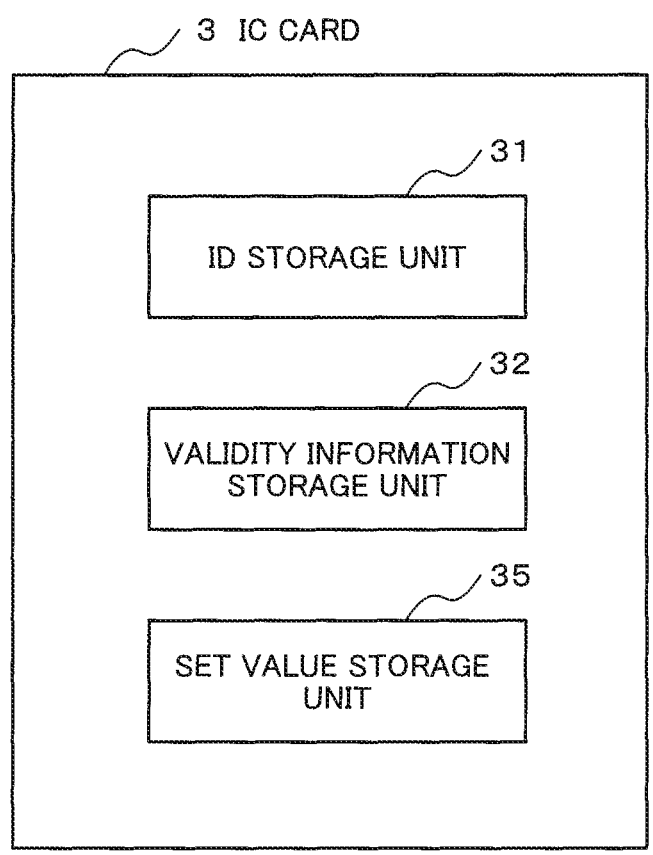
FIG. 13 is a block diagram illustrating the configuration of an IC card 3 according to a fifth exemplary embodiment.

FIG. 13 is a block diagram illustrating the configuration of an IC card 3 according to a fifth exemplary embodiment.

The IC card 3 includes an ID storage unit 31 which stores an ID read from a terminal device, a validity information storage unit 32 which stores validity information, and a set value storage unit 35 which stores a set value.

The terminal device reads from a stored blacklist, an invalidity count related to the ID read from the IC card 3 and compares the invalidity count with a set value read from the IC card 3. If the set value is equal to an invalidity count specification value, the terminal device executes predetermined processing, such as payment processing, based on validity information indicating the validity or invalidity of the IC card 3.

The terminal device having accessed the IC card 3 according to this exemplary embodiment can appropriately determine based on the blacklist the validity/invalidity of a credit card, an IC card 3 storing electronic money, or the like. This device can appropriately determine the validity/invalidity of even, for example, an IC card 3 which is temporarily invalidated and then validated again. The reason is the same as given in the first exemplary embodiment.

Although the present invention has been described above with reference to exemplary embodiments, the present invention is not limited to the above-mentioned exemplary embodiments. Various changes that would be understood to those skilled in the art can be made for the configurations or details of the present invention without departing from the scope of the present invention.

This application claims priority based on Japanese Patent Application No. 2013-138056 filed on Jul. 1, 2013, the disclosure of which is incorporated herein by reference in its entirety.

REFERENCE SIGNS LIST

1: terminal device
2: server device
3: IC card
4: validity control system
11: invalidity recording unit
12: list storage unit
13: processing unit
14: reception unit
15: reader/writer
21: log storage unit
22: list master storage unit
23: addition unit
24: deletion unit
25: distribution unit
26: log collection unit
27: keyboard
28: card master storage unit
2A: invalidity count storage unit
31: ID storage unit
32: validity information storage unit
33: counter
34: balance storage unit
35: set value storage unit
41: network
51: log ID
52: log count value
55: registered ID
56, 63: invalidity count
61: blacklist
62: invalid ID

What is claimed is:

1. A method comprising:
establishing connection to a terminal device, the terminal device reading from a stored blacklist, an invalidity count specification value related to an identifier read from a recording medium, comparing the invalidity count specification value with a set value read from the recording medium, and executing specific process based on validity information indicating one of validity and invalidity of the recording medium when occurring the set value is equal to the invalidity count specification value;
storing in invalidity count storage unit, the invalidity count specification value related to the identifier for the recording medium as invalidated;
storing an original of the blacklist;
receiving as input, the identifier for the recording medium as invalidated, setting forward the invalidity count specification value stored in the invalidity count storage unit and related to the input identifier, and adding the forward-set value to the original of the blacklist as the invalidity count specification value related to the input identifier;
receiving as input, the identifier for the recording medium as returned to valid state, and deleting from the original of the blacklist, the invalidity count specification value related to the input identifier; and
distributing the original of the blacklist to the terminal device.

2. The method according to claim 1, further comprising:
establishing connection to the terminal device that, when the set value is different from the invalidity count specification value, executes recording of updating the set value stored in the recording medium to the invalidity count specification value and setting the validity information to invalidity, and transmits a log comprising the updated set value and the identifier for the recording medium, and further receiving the log and accumulating in the invalidity count storage unit, and receiving the identifier for the recording medium as invalidated as input, setting forward a maximum set value of the set value stored in the invalidity count storage unit and related to the input identifier, and adding the forward-set value to the original of the blacklist as the invalidity count specification value related to the input identifier.

3. The method according to claim 1,
further storing the identifier for the recording medium to be invalidated and the invalidity count specification value in the invalidity count storage unit in relation to each other, and receiving, as input, the identifier for the recording medium as invalidated, setting forward the invalidity count specification value stored in the invalidity count storage unit and related to the input identifier, and adding the forward-set value to the original of the blacklist as the invalidity count specification value related to the input identifier.

4. A server device connected to a terminal device, the terminal device reading from a stored blacklist, an invalidity count specification value related to an identifier read from a recording medium, comparing the invalidity count specification value with a set value read from the recording medium, and executing a specific process based on validity information indicating one of validity and invalidity of the recording medium when occurring the set value is equal to the invalidity count specification value, the server device comprising:
an invalidity count storage for storing the invalidity count specification value related to the identifier for the recording medium as invalidated;
a list master storage for storing an original of the blacklist;
an adder for receiving the identifier for the recording medium as invalidated as input, setting forward the invalidity count specification value stored in the invalidity count storage and related to the input identifier, and adding the forward-set value to the original of the blacklist as the invalidity count specification value related to the input identifier;
a deleter for receiving as input, the identifier for the recording medium as returned to valid state, and deleting from the original of the blacklist, the invalidity count specification value related to the input identifier; and
a list distributor for distributing the original of the blacklist to the terminal device.

5. The server device according to claim 4, wherein
the server device establishes connection to the terminal device that, when the set value is different from the invalidity count specification value, executes recording of updating the set value stored in the recording medium to the invalidity count specification value and setting the validity information to invalidity, and transmits a log comprising the updated set value and the identifier for the recording medium, wherein the server device further comprises a log collector for receiving the log and accumulating in the invalidity count storage, and wherein the adder receives as input, the identifier for the recording medium as invalidated, sets forward a maximum set value of the set value stored in the invalidity count storage and related to the input identifier, and adds the forward-set value to the original of the blacklist as the invalidity count specification value related to the input identifier.

6. The server device according to claim 4, wherein
the invalidity count storage stores the identifier for the recording medium to be invalidated and the invalidity count specification value in the invalidity count storage in relation to each other, and the adder receives as input, the identifier for the recording medium as invalidated, sets forward the invalidity count specification value stored in the invalidity count storage and related to the input identifier, and adds the forward-set value to the original of the blacklist as the invalidity count specification value related to the input identifier.

7. A non-transitory computer readable medium for establishing connection to a terminal device, the terminal device reading from a stored blacklist, an invalidity count specification value related to an identifier read from a recording medium, comparing the invalidity count specification value with a set value read from the recording medium, and executing a specific process based on validity information indicating one of validity and invalidity of the recording medium when occurring the set value is equal to the invalidity count specification value, the non-transitory computer readable medium causing the computer to execute:
processing of storing in an invalidity count storage, the invalidity count specification value related to the identifier for the recording medium as invalidated;
list master storage processing of storing an original of the blacklist;
addition processing of receiving as input, the identifier for the recording medium as invalidated, setting forward the invalidity count specification value stored in the invalidity count storage and related to the input identifier, and adding the forward-set value to the original of the blacklist as the invalidity count specification value related to the input identifier;
deletion processing of receiving as input, the identifier for the recording medium as returned to valid state, and deleting from the original of the blacklist, the invalidity count specification value related to the input identifier; and
list distribution processing of distributing the original of the blacklist to the terminal device.

8. The non-transitory computer readable medium according to claim 7, wherein
in the computer connected to the terminal device that, when the set value is different from the invalidity count specification value, executes recording of updating the set value stored in the recording medium to the invalidity count specification value and setting the validity information to invalidity, and transmits a log comprising the updated set value and the identifier for the recording medium, the non-transitory computer readable medium causes the computer to execute:

log collection processing of receiving the log and accumulating in the invalidity count storage; and the addition processing of receiving the identifier for the recording medium as invalidated as input, setting forward a maximum set value of the set value stored in the invalidity count storage and related to the input identifier, and adding the forward-set value to the original of the blacklist as the invalidity count specification value related to the input identifier.

9. The non-transitory computer readable medium according to claim 7, wherein the non-transitory computer readable medium causes the computer to execute:

storing the identifier for the recording medium to be invalidated and the invalidity count specification value in the invalidity count storage in relation to each other; and receiving, as input, the identifier for the recording medium as invalidated, setting forward the invalidity count specification value stored in the invalidity count storage and related to the input identifier, and adding the forward-set value to the original of the blacklist as the invalidity count specification value related to the input identifier.

\* \* \* \* \*